Dec. 14, 1943.　　　J. D. RUSSELL　　　2,337,002
STEERING MECHANISM
Filed April 22, 1941　　　2 Sheets-Sheet 1
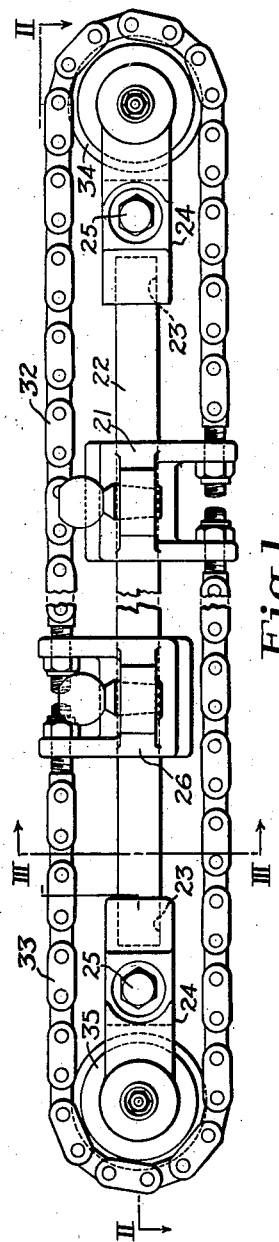
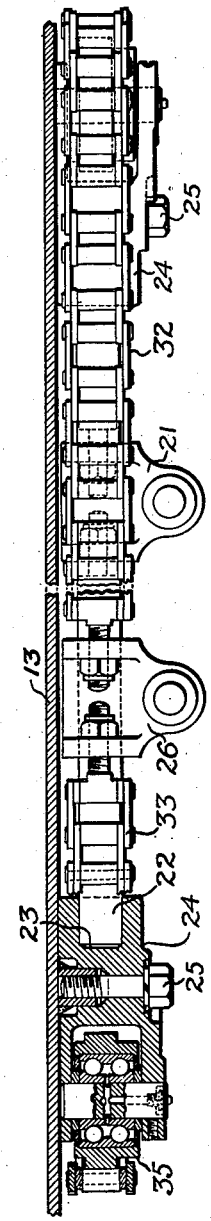
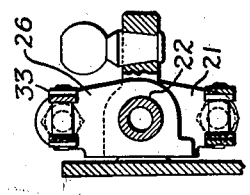
INVENTOR.
John D. Russell
BY
ATTORNEY Dec. 14, 1943.  J. D. RUSSELL  2,337,002
STEERING MECHANISM
Filed April 22, 1941  2 Sheets-Sheet 2

INVENTOR.
John D. Russell
BY
ATTORNEYS.

Patented Dec. 14, 1943

2,337,002

UNITED STATES PATENT OFFICE 2,337,002

STEERING MECHANISM

John D. Russell, Sugarcreek Township, Venango County, Pa., assignor to Joy Manufacturing Company, a corporation of Pennsylvania Application April 22, 1941, Serial No. 389,721

9 Claims. (Cl. 280—91)

This invention relates to mechanism for steering self-propelled vehicle, and more particularly to improvements in the steering mechanism for vehicles having front and rear sets of steerable wheels.

The principal object of this invention is to provide a new and novel means in the steering mechanism for vehicles having front and rear sets of steerable wheels for equalizing the turning movement of the front and rear sets of wheels of the vehicle.

Another object is to provide an equalizer between the front and rear set of steerable wheels of a vehicle which is simple in construction, positive in operation and easy to install and maintain on the vehicle.

A further object of this invention is to provide a steering mechanism for vehicles having front and rear sets of steerable wheels in which means are provided for turning the rear set of wheels through the same angle as the front wheels are turned, but in an opposite direction thereto.

These and other objects which will hereinafter be made apparent to those skilled in this particular art, are accomplished by means of this invention, one embodiment of which is described in the following specification and illustrated in the accompanying drawings, wherein:

Fig. 1 is a view in side elevation of a steering equalizing mechanism made in accordance with my invention;

Fig. 2 is a top plan view of the equalizing mechanism having a portion shown in section for convenience of illustration;

Fig. 3 is a sectional view taken on line III—III of Fig. 1; and

Figure 4:
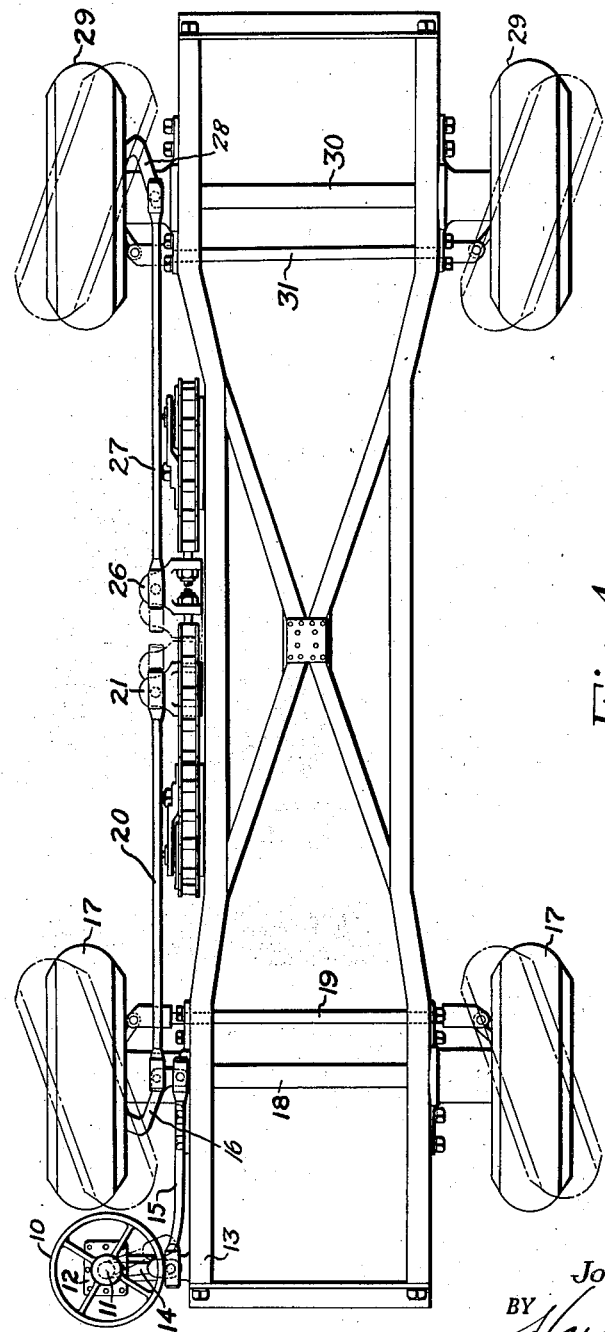
Fig. 4 is a plan view of a vehicle chassis equipped with a front and rear set of steerable wheels, and illustrating the arrangement of the equalizer in the steering mechanism.

Referring in detail to the drawings, there is shown in Fig. 4 a steering wheel 10 secured to a steering shaft 11, which is journaled in a box 12 mounted on the frame 13 of a vehicle. The steering shaft 11 has an arm 14 extending therefrom which is connected by a rod 15 with the steering arm 16 of a set of front steerable wheels 17. The wheels 17 are mounted on an axle 18 carried by the frame 13, and are connected together by a tie rod 19, so that turning of the steering arm 16 will steer or guide both of the wheels 17.

The steering arm 16 is also connected by a rod 20 with a U shaped member 21, the legs of which extend downwardly, slidably mounted on a horizontally extending shaft 22, having its ends received in sockets 23 in the ends of clevises 24 which are secured to the side of the vehicle frame 13 by bolts 25.

Also slidably mounted on the shaft 22 is a U shaped member 26, of similar shape and construction to the member 21, the legs of which, however, extend upwardly, which is connected by a rod 27 with the steering arm 28 of a set of rear steerable wheels 29.

The wheels 29 are carried by an axle 30 extending transversely of the frame 13 and are connected together by a tie rod 31 so movement of the steering arm 28 will turn both of the wheels 29.

In order that the set of rear wheels 29 will be turned the same degree, but in the opposite direction from the set of front wheels 17, when the steering wheel 10 is operated the legs of the U shaped members 21 and 26 are connected together by means of a pair of chains 32—33. Chain 32 has one end connected to one of the upright legs of the U shaped member 26 and extends forwardly above the shaft 22 and passes around the roller 34 carried by the clevis 24, and then rearwardly underneath the shaft 22, and has its opposite end attached to one of the downwardly extending legs of the U shaped member 21. Chain 33 has one end connected to the other upright leg of the member 26 and extends rearwardly over the shaft 22 and passes around a roller 35 carried by the clevis 24, and has its other end attached to the other downwardly extending leg of the U shaped member 21.

From the foregoing construction it is apparent that when the steering wheel 10 is turned counter-clockwise the steering arm 14 will be moved rearwardly to the dotted line position shown in Fig. 4, and the end of the steering arm 16 will, likewise, through the tie rod 15, be moved rearwardly and turn the wheels 17 to the left in position to make a left hand turn, or to the dotted position shown in Fig. 4. This rearward movement of the end of the steering arm 16 will cause the member 21 to slide rearwardly along the shaft 22, and since the member 21 is connected to the member 26 through the chains 32—33, the member 26 will be moved forwardly along the shaft 22, to the dotted line position, shown in Fig. 4, and pull the steering arm 28 forwardly to turn the rear set of wheels 29 in the opposite direction from that of the wheels 17, or to a position to swing the rear of the vehicle to the right, but through the same angular degree as the front wheels.

When the steering wheel 10 is rotated clockwise, or in the opposite direction, the wheels 17 will be turned to the right to make a right hand turn. This movement of the steering arm 16 will move the member 21 forwardly along the shaft 22, and the member 26 rearwardly along the shaft 22, to turn the rear wheels 29 to the left or in the opposite direction from that in which the front wheels are turned; thus it is apparent that with my improved equalizer the members 21 and 26 move through the same distance on the shaft 22 for the desired turning of the steering wheel 10, and the wheels 29—17 turn through the same angle but in opposite directions to each other.

While I have described my invention in connection with chassis of a vehicle, it is apparent that since all of the equalizing mechanism is located on the side of a car, that it is especially adapted for use in four-wheel steering vehicles adapted to be used in underground mine chambers and the like where height is an important factor.

While one illustrative embodiment of my invention has been described, it is not my intention to limit the scope of the invention to any particular embodiment or otherwise than by the terms of the appended claims.

What I claim is:

1. A steering equalizer for a vehicle having front and rear sets of steerable wheels, each having a steering arm connected thereto, comprising a shaft mounted on the side of said vehicle between said front and rear sets of steerable wheels, a member slidably mounted on said shaft and connected to the steering arm of the front steerable wheels whereby turning of said steering arm will move said member along said shaft, and flexible means connecting said member to the steering arm of the rear set of steerable wheels, adapted to pull said rear steering arm forwardly as said member moves rearwardly along said shaft and to push said steering arm rearwardly as said member moves forwardly along said shaft.

2. A steering equalizer for a vehicle having front and rear sets of steerable wheels, each of which set of wheels has a steering arm connected thereto, comprising a horizontal shaft mounted on the side of said vehicle between said front and rear sets of steerable wheels, a pair of members slidably mounted on said shaft, a rod connecting one of said members with the steering arm of the front wheels, a rod connecting the other of said members with the steering arm of the rear wheels, and flexible means for connecting said members whereby when one is moved along said shaft in one direction the other will be moved an equal distance along said shaft in the opposite direction.

3. A steering equalizer for a vehicle having front and rear sets of steerable wheels, each of which is provided with a steering arm, comprising a horizontally extending shaft mounted on the side of said vehicle, between said front and rear sets of wheels, a pair of members mounted on said shaft for movement therealong, one of said members being connected to the steering arm of the front wheels, and the other being connected to the steering arm of the rear wheels, and means for connecting said members to each other whereby when the member connected to the front steering arm is moved along said shaft in one direction, the member connected to the rear steering arm will be moved a like distance in the opposite direction.

4. A steering equalizer for vehicles having front and rear sets of steerable wheels, each of which is provided with a steering arm, comprising a horizontally extending shaft mounted on said vehicle, a pair of members mounted for sliding movement along said shaft and having oppositely projecting legs, one of said members being connected to the steering arm of the front wheels and the other being connected to the steering arm of the rear wheels, and a pair of chains connecting the oppositely projecting legs of said members, said connecting chains being so arranged that when the member connected to front steering arm is moved on the turning of said steering arm, the other member will be moved simultaneously in the opposite direction to turn the steering arm of the rear wheels.

5. In a steering mechanism for vehicles having front and rear sets of steerable wheels, each set of which is provided with a steering arm, the combination comprising a shaft, a member slidably mounted on said shaft and having a leg projecting above said shaft, a member slidably mounted on said shaft and having a leg projecting below said shaft, one of said members being connected to the steering arm of one set of wheels and the other being connected to the steering arm of the other set of wheels, means for turning the steering arm of the front steerable wheels to slide the member connected thereto along said shaft, and means for connecting the oppositely projecting legs of said members together whereby said members will move simultaneously in opposite directions along said shaft.

6. A steering mechanism for vehicles having front and rear sets of steerable wheels, each set of which is provided with a steering arm, the combination comprising a horizontally extending shaft, a member mounted on said shaft and connected to the front steering arm and movable therewith, a member mounted on said shaft and connected to the rear steering arm, a pair of chains connecting said members, one of said chains extending around one end of said shaft and the other around the opposite end thereof and means for turning said front steering arm to turn said front steerable wheels, the arrangement of said chains being such that when the member connected to said front steering arm is moved in one direction along said shaft, the member connected to the rear steering arm will be moved in the reverse direction along said shaft to turn said rear steering arm and turn said rear steerable wheels in the opposite direction to the direction of turn of said front steerable wheels.

7. A steering mechanism for vehicles having front and rear sets of steerable wheels, each of which set of wheels is provided with a steering arm, the combination comprising a shaft carried by said vehicle, a roller carried by said shaft at each end thereof, a pair of members slidably mounted on said shaft between said rollers, one of said members being connected to the steering arm of the front set of wheels and the other to the steering arm of the rear set, and a pair of flexible members attached to said slidably mounted members, one of said flexible members extending around one of said rollers, and the other flexible member around the other of said rollers.

8. A steering equalizer for a vehicle having front and rear sets of steerable wheels, each having a steering arm, comprising a shaft, a pair of members slidably mounted on said shaft mounted on said vehicle, one of said members being rigidly connected to the steering arm of one set of wheels and the other being rigidly connected to the steering arm of the other set, and means for connecting said members whereby when one member is moved along said shaft in one direction, the other member will be moved an equal distance along said shaft in the opposite direction including a chain extending around one end of said shaft and having its ends connected to said members, and a second chain extending around the opposite end of said shaft and having its ends connected to said members.

9. A steering equalizer for a vehicle having front and rear sets of steerable wheels, each having a steering arm, comprising a shaft carried by said vehicle, a pair of members slidably mounted on said shaft, one of said members being rigidly connected to the steering arm of one set of wheels and the other being rigidly connected to the steering arm of the other set, and means for connecting said members whereby when one member is moved along said shaft in one direction, the other member will be moved an equal distance along said shaft in the opposite direction including a flexible member extending around one end of said shaft and having its ends connected to said slidable members, a flexible member extending around the opposite end of said shaft and having its ends connected to said slidable members, and means for guiding each of said flexible members around its respective end of said shaft.

JOHN D. RUSSELL.